Aug. 19, 1941.    F. E. ARNDT    2,252,691
MATERIAL SPREADER
Original Filed March 19, 1937    2 Sheets-Sheet 1

INVENTOR:
FRANKLIN E. ARNDT,
By Chas. M. Nissen,
ATTY.

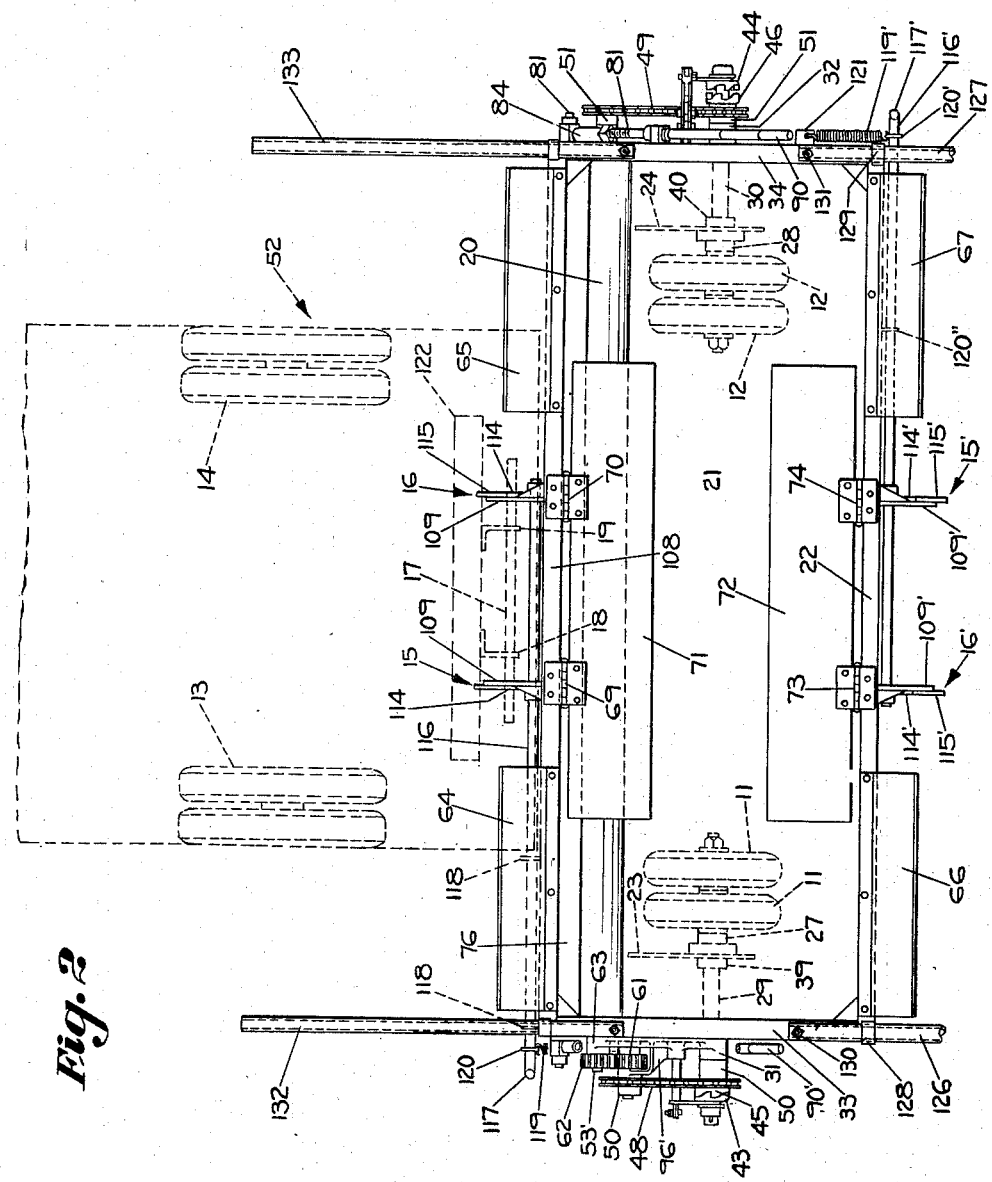

Patented Aug. 19, 1941

2,252,691

UNITED STATES PATENT OFFICE 2,252,691

MATERIAL SPREADER

Franklin E. Arndt, Galion, Ohio, assignor to The Galion Iron Works & Manufacturing Company, a corporation of Ohio Original application March 19, 1937, Serial No. 131,837. Divided and this application September 22, 1937, Serial No. 165,064

6 Claims. (Cl. 280—33.44)

My invention relates to road material spreaders of the type which is adapted to be hitched to and hauled behind a dumping truck traveling along the roadway, and one of the objects of the invention is the provision of improved and efficient apparatus hitching a road material spreader to such truck for spreading material along a roadway in either direction of travel along the same.

A further object of the invention is the provision of improved and efficient hitching apparatus for a spreader which extends substantially beyond the sides of the path of travel of the draft vehicle to which the spreader is connected.

Another object of the invention is the provision of improved and efficient mechanism for hitching to a hauling vehicle a road material spreader having feeding mechanism adapted to be operated both when the spreader is pulled forwardly and when pushed rearwardly along a roadway by means of such hitching mechanism.

Another object of the invention is the provision of improved mechanism for balancing a spreader to facilitate its manual adjustment and its connection to a draft vehicle.

A further object of the invention is the provision of improved hitching mechanism for connecting a spreader to a draft vehicle for pulling or pushing along a roadway.

More particularly it is the object of the present invention to provide for a road material spreader, mechanism for releasably hitching the same to the rear end of the frame of a self-propelled dumping truck on a transverse pivotal axis with the spreader maintained in right angular relation to the roadway during travel of the truck and spreader therealong.

Other objects of the invention will appear hereinafter, the novel features and combinations being set forth in the appended claims.

This application is a division of my co-pending application Serial No. 131,837, filed March 19, 1937, for an improvement in material spreaders.

In the accompanying drawings,

Fig. 2 is a plan view of the spreader connected to a truck drawbar shown in dotted lines.

Figure 1:
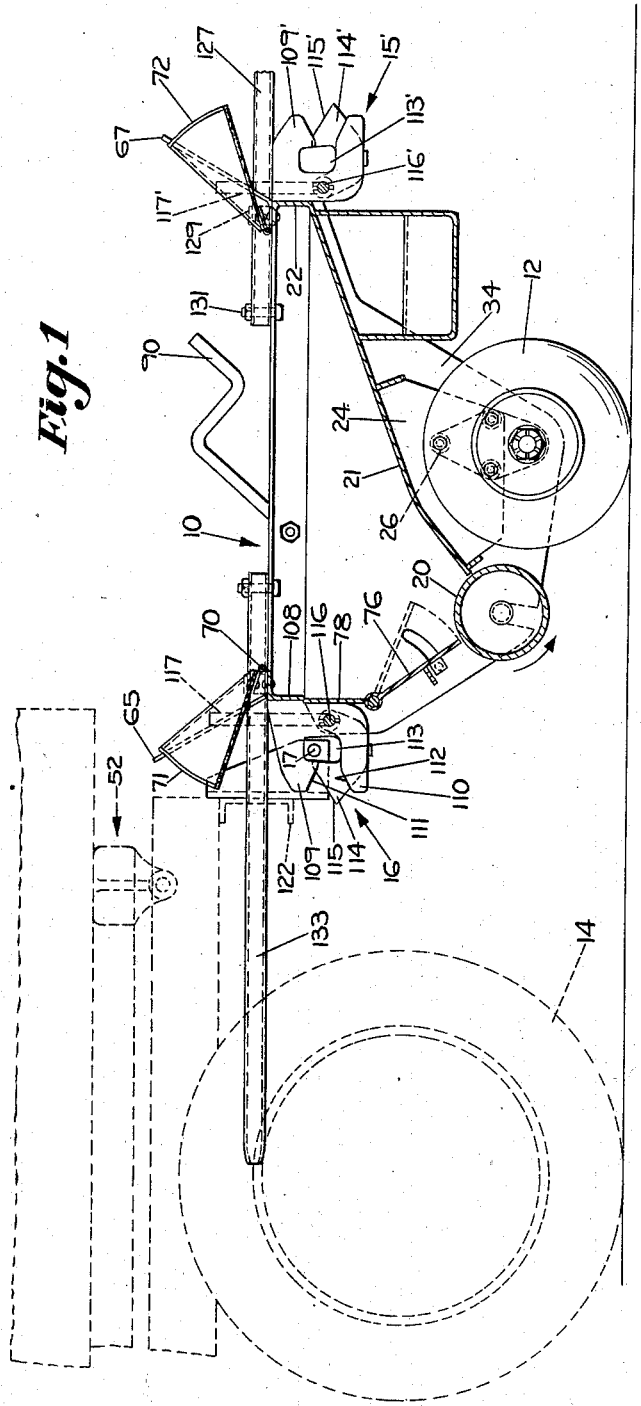
Fig. 1 is an elevational view of my improved spreader with the forward hitching mechanism connected to the rear end of the frame of a dumping truck shown in dotted lines.

In the first place it should be understood that the hopper shown in Figs. 1 and 2 is adapted to extend substantially beyond both sides of the draft vehicle or hauling dumping truck 52 shown in dotted lines in Figs. 1 and 2. The hopper 10 is supported upon wheels 11 and 12 which are set inwardly from the lateral end walls of the hopper so as to track just outside of the paths of travel of the wheels 13 and 14 of the truck shown in dotted lines in Fig. 2. That is to say, when the hitching devices 15 and 16 at the front side of the spreader are connected, as shown in dotted lines in Fig. 2, to the drawbar 17 secured by means of the brackets 18, 19 to the rear end of the dumping truck, the wheels 11 and 12 of the spreader will travel along paths immediately outside of the paths of travel of the wheels 13, 14 of the dumping truck.

The hopper 10 comprises an open top and an open bottom, and in the latter is located the feed roll 20, as shown in Fig. 1. The bottom wall 21 of the hopper slopes downwardly to the feed roll 20. On the underside of the bottom wall 21 are secured by means of welding, the bracket plates 23, 24 to which are secured by means of the bolts 26, as shown in Fig. 1, the journal bearings 27, 28 for the inwardly extending supporting wheel shafts 29, 30. The wheels 11 and 12 are keyed to the shafts 29 and 30 to rotate therewith.

The outer ends of the shafts 29 and 30 are journaled in bearings 31, 32 which are secured to the end walls 33, 34 of the elongated hopper.

Splined to the outer ends of the shafts 29 and 30 are the jaw clutch elements 43 and 44, as shown in Fig. 2. Associated with the jaw clutch elements 43, 44 are the slip clutch elements 45, 46 which are loosely journaled on the shafts 29 and 30. The slip clutch elements 45 and 46 are connected to sprockets meshing with sprocket chains 48, 49 which mesh with spaced sprockets 50 and 51, as shown in Fig. 2.

When the dumping truck 52, shown in dotted lines in Fig. 1, moves forwardly or toward the left as viewed in Fig. 1, the wheels 12 will drive the clutch element 44 in proper direction to drive the chain 49 when the clutch is applied and consequently the sprocket 51 will be rotated in a clockwise direction as viewed from the right hand end of Fig. 2. When the wheels 12 rotate clockwise, as similarly viewed, with the clutch 44, 46 thrown in, the sprocket and chain drive mechanism will effect rotation of the feed roll 20 in an anti-clockwise direction as indicated by the arrow in Fig. 1. Consequently material in the hopper will be fed gradually in a thin, flat stream transversely across the path of travel of the truck 52 and substantially beyond both sides of such path.

The clutch element 44 which is splined to the outer end of the shaft 30 may be applied or released by means of a shipper. By means of similar manually operated shipper mechanism, the clutch element 43 at the left-hand end of Fig. 2 may be applied or released.

When the dumping truck 52 pulls the spreader toward the left as viewed in Fig. 1, the wheels 11 and 12 drive the shafts 29 and 30. By reason of the reversal of the clutches at opposite ends of the hopper, as shown in Fig. 2, only one of the clutches can be held applied when the hopper is traveling in a given direction. For instance, when the spreader moves toward the left, as viewed in Fig. 1, only the clutch at the right-hand end of Fig. 2 can be applied since the clutch element 43 will slip past the clutch element 45 and not effect any driving by means of the sprocket chain 48. In a similar manner, if the truck 52 is backed or moved rearwardly or toward the right, as viewed in Fig. 1, the clutch element 44 will slip past the clutch element 46 and not effect any driving of the chain 49, but by such rearward movement of the truck 52, the clutch 43, 45 may be applied and remain so, to effect continuous driving of the chain 48 during rearward movement of the truck 52.

The rearward movement of the truck 52 of Fig. 1 will cause the sprocket chain and spur gearing shown at the left-hand end of Fig. 2, to transmit rotation to the feed roll 20 in the same direction as when the truck 52 moves forwardly. That is to say, when the truck 52 moves toward the left, as viewed in Fig. 1, the sprocket and chain gearing at the right-hand end of Fig. 2 will rotate the feed roll 20 in feeding direction, and when the truck 52 moves rearwardly and the sprocket chain gearing and spur gearing at the left-hand end of Fig. 2 are operated, the feed roll 20 will again be driven in feeding direction, by reason of the reverse gearing 61, 62.

Inasmuch as the hopper of the spreader extends transversely of the roadway a substantial distance beyond both sides of the path of travel of the dumping truck as shown in Fig. 2, it is desirable to provide spaced-apart outwardly extending aprons or sectional deflecting plates 64, 65 secured to the upper edges of the hopper at one side thereof, and also similar aprons 66, 67 secured to the outer edges of the opposite side of the hopper, as illustrated in Fig. 2. Intermediate the apron plates 64, 65 at the edge 108 of the hopper is hinged at 69, 70 a rectangular sheet of stiff flexible material, such as rubber or rubber belting 71, so that when swung upwardly to the position shown in Fig. 1 it may flexibly connect the inner edges of the adjacent fixed or stationary apron plates 64 and 65. In a similar manner a rectangular sheet of heavy or stiff flexible material, such as rubber or rubber belting 72, is hinged at 73, 74 to the edge 22 of the hopper between the fixed or stationary apron plates 66, 67. With the flexible members 71 and 72 in their upper positions to connect the inner edges of the plates 64, 65 and 66, 67, the forward and rear walls of the hopper are in effect extended upwardly so as to prevent spilling of the material onto the hitching devices 15, 16 or 15', 16' when material is dumped from the truck into the hopper and also enable loading of the material heaping full into the hopper without spilling beyond the uppermost edges of the hopper.

The spaced-apart hitching devices 15, 16 of Fig. 2 are preferably connected to the transverse drawbar 17 on the rear end of the frame of the hauling truck, in the position shown in full lines 15 and 16 in Fig. 2. That is to say, the hitching devices 15 and 16 are mounted on the spreader at a sufficient distance apart to be located outside of the brackets 18, 19 of Fig. 3 and at such distances therefrom as to facilitate manual connection of the hitching devices to the drawbar 17. Furthermore, the brackets 18, 19 act as abutments to prevent the spreader from shifting transversely relatively to the path of travel of the truck any more than limited distances.

The top of the hopper may comprise a rectangular frame composed of angle irons including the forward transverse angle iron 108, as shown in Fig. 2. The lower edges of the rectangular frame composed of angle irons at the open top of the hopper, may be welded to the upper edges of the end walls 33, 34, the upper edge of the bottom wall 21, and the upper edge of the vertical wall 78.

The hitching devices 15, 16 may each comprise an upper hooked jaw 109 and a lower abutment jaw 110, rigidly connected together or made integral and securely attached by means of welding or otherwise to the transverse angle iron 108 which extends along the forward edge of the upper side of the hopper 10. As shown in Fig. 1 the underside of the upper jaw 109 may be beveled at 111 and the lower abutment jaw may be beveled at 112 so that there will be a converging relation between the beveled surfaces 111, 112 toward the rectangular opening 113 between the upper and lower jaws 109, 110. It should be understood that each hitching device 15, 16 comprises a pair of upper and lower bevel jaws 109, 110.

Associated with each pair of jaws 109, 110 is a latch plate 114 the forward end of which is beveled at 115 in Fig. 1. Each of the two latch plates 114, 114 is pinned or otherwise secured to the rock shaft 116 to rock therewith when actuated by the handle 117 located on the outer side of the end wall 33 of the hopper 10. The rock shaft 116 may be mounted in the bearings 118, 118 on the forward side of the angle iron 108 at the upper forward edge of the hopper 10.

The latch 114 is hook-shaped and so associated with the jaws 109 and 110, as to connect the intervening space between the jaws at the inner ends of the beveled surfaces 111, 112 and thereby close the transverse opening 113 between the jaws. The latch plate 114 is held in the position shown in Fig. 1 by means of a spring 119, one end of which is connected to an anchorage on the outer wall of the plate 33, and the other end of which is connected to a plate 120 secured to the rock shaft 116. The rock shaft 116 is adapted to be actuated by the handle 117 against the action of the spring 119 to move the latch plate 114 downwardly as viewed in Fig. 1, and in this manner the hitching devices may be released from the drawbar 17 shown in Fig. 2.

When the hitching devices 15, 16 are to be connected to the drawbar 17 the whole spreader as a unit may be manually moved about on the wheels 11, 12 until the beveled surfaces 115 of the latch plates 114 engage the underside of the drawbar 17, whereupon such engagement will automatically move the latch plates 114 downwardly against the action of the spring 119 until the latch plates snap over the rear end of the drawbar 17 whereupon the latter will be locked between the jaws 109, 110 to occupy a position in the transverse opening 113 of Fig. 1. It should be particularly noted that both latch plates 114 are always operated simultaneously either automatically when the spreader is pushed into place relative to the drawbar 17 or when the latch plates are operated manually to release the hitching devices 15, 16 from the drawbar 17.

It will be seen by reference to Fig. 1 that the diameter of the drawbar 17 is appreciably less than the vertical dimension of the opening 113 and consequently the spreader may have a limited tilting movement transversely of the roadway relatively to the hauling vehicle. Such flexibility of transverse tilting is useful not only during transportation along the highway but also during spreading operations while dumping from the dumping truck is taking place and the deflector 71 or 72 is being relied on to prevent spilling of material onto the hitching devices. Furthermore, such freedom of transverse tilting is of advantage to facilitate connection or disconnection of the hitching devices 15, 16 or 15', 16' to the drawbar 17 while the hopper is moved into or out of hitching positions while the handles 126, 127, 132, 133 are being grasped by the operators.

The hitching devices 15', 16' on the opposite side of the hopper are similar in construction to the hitching devices 15 and 16 and include upper fixed jaws 109' and beveled latch plates 114' each provided with a forward beveled surface 115'. The latches 114' are operable by means of a rock shaft 116' and handle 117' located on the outer side of the end wall 34, as shown in perspective in Fig. 3. The latches 114' are yieldingly held in place relative to the upper and lower fixed jaws, by means of the spring 119' which is connected at one end to the bracket 121 secured to the end wall 34 and serving as an anchorage for one end of the spring 119'. The other end of the spring 119' is connected to the plate 120' secured to the rock shaft 116'.

Figure 3:
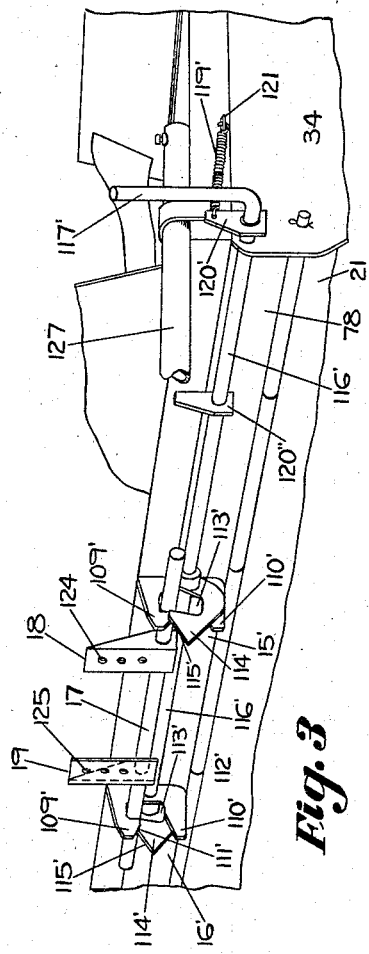
Fig. 3 is a perspective view of the hitching mechanism shown at the rear in Figs. 1 and 2.

As shown in Fig. 2, the latches 114' are closely associated with the outer surfaces of the jaw plates 109' and as shown in Fig. 3 the parallel rearwardly extending flanges of the bracket plates 18, 19 are located inwardly of the jaw plates 109'. Consequently when the hitching mechanism flexibly connects the spreader to the towing vehicle, the inner faces of the jaw plates 109' abut against the outer faces of the rearwardly extending flanges of the bracket plates 18, 19 to limit the lateral movement of the spreader relative to the towing vehicle. The latches 114' being on the outer sides of the jaw plates 109' are always free to be applied or released as desired.

Inasmuch as frames of self-propelled dumping trucks such as that illustrated in dotted lines in Fig. 1, may be of various heights from the road surface, it is preferable to provide a transverse metal channel 122 provided with bolts adapted to extend through one of the vertically spaced holes 124, 125 in the vertical bracket plates 18, 19 shown in Figs. 2 and 3. By means of this construction the drawbar 17 may be secured to the rear end of the frame of the self-propelled dumping truck so that the drawbar 17 will be held at such adjusted elevation as will conform with the height of the hitching devices 15, 16 relative to the road surface, when the horizontal upper frame of the hopper is in approximately level position. As shown in Fig. 3, the drawbar 17 extends through perforations in the lower ends of the vertical rearwardly projecting plates of the angle iron brackets 18 and 19, so as to facilitate welding or otherwise securing the drawbar 17 to the brackets 18 and 19.

In order to facilitate movement of the spreader on its wheels 11, 12 in order to connect the hitching devices 15, 16 to the drawbar 17, I provide rearwardly extending handle bars 126 and 127 securely mounted on the end plates 33, 34 of the hopper to extend rearwardly therefrom. Such handle bars 126, 127 may be in the form of pipes extending through loops 128, 129 on the rear corners of the rectangular frame of the hopper, and secured at their inner ends by means of bolts 130, 131 to the end angle irons of the rectangular frame of the hopper.

On account of the extra length of the hopper, spreading of material from the hopper may be effected beyond the sides of the path of travel of the self-propelled dumping truck shown in dotted lines at 52 in Figs. 1 and 2. Consequently the handles 126 and 127 are located at opposite ends so that one or two persons may manually move the spreader about on its wheels 11, 12 until the spring pressed latches are automatically snapped over the drawbar 17 and the spreader is hitched to the draft vehicle or self-propelled dumping truck with the assurance that it will follow the path of travel of the dumping truck while having flexibility of up and down movement over irregularities in the roadway on the drawbar 17 as a pivot.

As shown in Fig. 2, handle bars 132, 133 may also be provided on the opposite side of the spreader at the opposite corners and in alignment respectively with the handle bars 126 and 127. When the spreader is hitched to the dumping truck 52, as shown in Fig. 2, the forwardly extending handle bars 132 and 133 are located in such positions as to have ample clearance from the sides of the dumping truck.

During rapid transportation along the highway, of the spreader, while being hauled by a draft vehicle, the rear hitching mechanism may be used to haul a trailer, a spreader, or any other vehicle. The main purpose of providing the hitching mechanism both on the front side and on the rear side of the hopper is to reduce the cost of the spreader by omitting one of the driving connections between the feed roll and one set of supporting wheels, either the set of wheels designated 11 or the set of wheels designated 12 in Fig. 2. That is to say, by adding the rear hitching mechanism shown in Fig. 3, the transmission mechanism from the wheels 11 to the feed roll 20 may be omitted and only the transmission mechanism from the wheels 12 to the feed roll included.

The slip clutch 44, 46 of Fig. 2 when applied will effect driving of the feed roll 20 in a clockwise direction, as viewed from the right-hand end of Fig. 2, when the hauling vehicle moves forwardly. When the spreader is connected to the truck 52, as shown in Fig. 1, and the truck is moved rearwardly, the clutch 44, 46 will be automatically released and consequently the feed roll 20 will not be driven. By turning the spreader end for end, however, so as to connect the hitching mechanism 109', 110', 114' (Fig. 3) to the drawbar 17, rearward movement of the truck may be relied on to drive the feed roll 20 in the proper direction to feed the material from the hopper under the lower edge of the valve or gate plate 76 as regulated thereby.

It is preferred, however, to provide reverse transmission mechanism between the feed roll 20 and both sets of wheels 11 and 12 because then the feed roll 20 may be located rearwardly of the wheels 11, 12 so as to feed priming or semi-liquid material onto the roadway without permitting either the wheels of the spreader or the wheels of the hauling vehicle to contact with the same. Then by filling the hopper with dry material, such as crushed stone or gravel, such dry material by rearward movement of the truck and the spreader, may be fed onto the previously spread priming material, and in that event the wheels of the spreader and the wheels of the truck will come in contact only with the upper layer of dry material. During such operations the spreader is connected to the dumping truck by means of the hitching mechanism shown in Fig. 3.

When transmission mechanism between both sets of wheels 11, 12 and the feed roll is included in the spreader mechanism, the hitching devices 15, 16 may be omitted and in that event the spreader shown in Fig. 1 is turned end for end so as to connect the hitching devices 15', 16' of Fig. 3 to the drawbar 17 with the feed roll located rearwardly of the wheels 11, 12. It can readily be seen that when the spreader is hitched by means of the mechanism shown in Fig. 3, to the rear end of the frame of the truck with the feed roll 20 rearwardly of the wheels 11, 12, forward movement of the truck will effect driving of the sprocket chain 48, and rearward movement of the truck will effect driving of the sprocket chain 49. That is to say, the feed roll 20 will always be driven in a clockwise direction when viewed from the end of the hopper where the end plate 34 is located, and this is true whether the truck moves forwardly or rearwardly provided both of the feed roll transmission mechanisms shown in Fig. 2 are included in the spreader.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. Hitching mechanism for connecting a material spreader to a hauling vehicle, the combination with a horizontal drawbar, of mechanism for securing such drawbar to the rear end of the hauling vehicle, coupling devices adapted to be secured to the front side of the spreader in spaced-apart relation in position to receive said drawbar, said coupling devices each comprising a hooked jaw and a straight jaw fixed to the spreader in vertically spaced-apart relation and closely associated with a hooked latch member mounted on a rock shaft positioned to enable the latch members to engage said drawbar and co-operate with the said jaws to hitch the spreader to the hauling vehicle, an extension from said rock shaft journaled to one of the lateral ends of the spreader, resilient means connected to such extension for applying the latch members to the drawbar and a handle at such lateral end of the spreader and connected to said shaft to rock the same to effect release of said hooked latch members from said drawbar.

2. Hitching mechanism for spreaders comprising upper jaws adapted to be fixed to the front side of a spreader in spaced-apart relation, lower fixed abutment jaws spaced respectively below said upper jaws, said spaced-apart jaws consisting of two plates each having an upper and a lower jaw in the same vertical plane, hooked latches one associated with the outer side of each of said jaw plates, a releasing rod connected to said latches to release the same, a plurality of plates having openings therein for receiving said rod, said last-named plates being adapted to be secured to the spreader to effect journaling of said rod to the spreader, a bracket secured to said rod near one side of the spreader, and a spring adapted to connect said last-named bracket to such side of the spreader to effect automatic application of the latches when said rod is manually released, the manual release of said latches by rocking said rod being against the action of such spring.

3. Hitching mechanism for flexibly connecting a road material spreader to a towing vehicle, comprising the combination with jaw plates each consisting of an upper jaw and a lower jaw in a single vertical plane, each upper jaw having a lower inverted U-shaped face, said jaw plates being adapted to be secured to the advancing side of the spreader in spaced-apart relation, a rod adapted to be secured to the towing vehicle, said rod having a diameter less than the vertical spaces between the upper and lower jaws of said jaw plates so that the spreader may tilt transversely of the roadway relatively to the towing vehicle to a limited extent, a rock shaft journaled to one end of the spreader to extend transversely of the roadway, said rock shaft being journaled also to said jaw plates, spaced-apart latch members on said rock shaft in close association with said jaw plates, said latch members being hooked to provide inner faces forming in co-operation with the inner faces of the jaws of said plates rectangular openings for the rod to afford the relatively tilting movement aforesaid, a spring connected between said spreader and said shaft to urge said latch members to coupling positions in association with said jaw plates when said rod is embraced by all of said jaws and latch members, and manual means operable against the action of said spring to effect uncoupling of the hitching mechanism from the towing vehicle.

4. Hitching mechanism for flexibly connecting a road material spreader to a towing vehicle, comprising the combination with spaced-apart jaw plates each consisting of an upper jaw and a lower jaw, each upper jaw having an inverted U-shaped face, said jaw plates being adapted to be connected to such spreader, a drawbar rod adapted to be secured to the towing vehicle, said rod having a diameter substantially less than the vertical spaces below said U-shaped faces so that the spreader may tilt transversely of the roadway relatively to the towing vehicle to a limited extent, spaced-apart latch members in close association with said jaw plates, said latch members being hooked to provide inner faces forming in co-operation with the inner faces of the jaws of said plates lateral openings for the rod to afford the relatively tilting movements aforesaid, and means for applying said latch members to said drawbar rod and for releasing the same therefrom.

5. Hitching mechanism for spreaders comprising an upper hooked jaw adapted to be fixed to a spreader, said jaw having an inner inverted U-shaped surface comprising opposing parallel vertical faces, a lower abutment jaw spaced below said upper jaw and also adapted to be fixed to such spreader, a hooked latch associated with said jaws to close the gap between the same in position to co-operate with the upper hooked jaw and with said lower abutment jaw to confine a drawbar of a draft vehicle to the lateral opening formed by said jaws and said hooked latch, resilient means for applying the latch; and manual means for moving the latch down away from the upper hooked jaw to release the drawbar.

6. Hitching mechanism for spreaders comprising the combination with a hooked jaw having an outer beveled face and an inner vertical face, of a horizontal jaw having an outer beveled face in converging relation to said first-named beveled face and spaced vertically therefrom, said jaws being adapted to be fixed to a spreader, a hooked latch having an outer beveled face in converging relation to the beveled face on the hooked jaw and approximately parallel to the beveled face on said horizontal jaw, said hooked latch having an inner vertical face in a vertical plane extending laterally through the inner face of the hooked jaw, resilient means connected to said hooked latch to apply the same to a drawbar on a towing vehicle, said drawbar being adapted to be engaged by the converging bevel faces of the hooked jaw and latch and thereby effect movement of said latch to releasing position against the action of said resilient means so that the latter will act automatically to snap the latch into locking position relative to the drawbar when the latter is located between said jaws, and manual means connected to said latch to move the latter into position for release of said drawbar.

FRANKLIN E. ARNDT.